July 21, 1931. W. S. JONES 1,815,376
ROTARY SPEAR
Filed Oct. 6, 1928 2 Sheets-Sheet 1

INVENTOR.
WINFIELD S. JONES,
BY
ATTORNEY

July 21, 1931.  W. S. JONES  1,815,376
ROTARY SPEAR
Filed Oct. 6, 1928   2 Sheets-Sheet 2
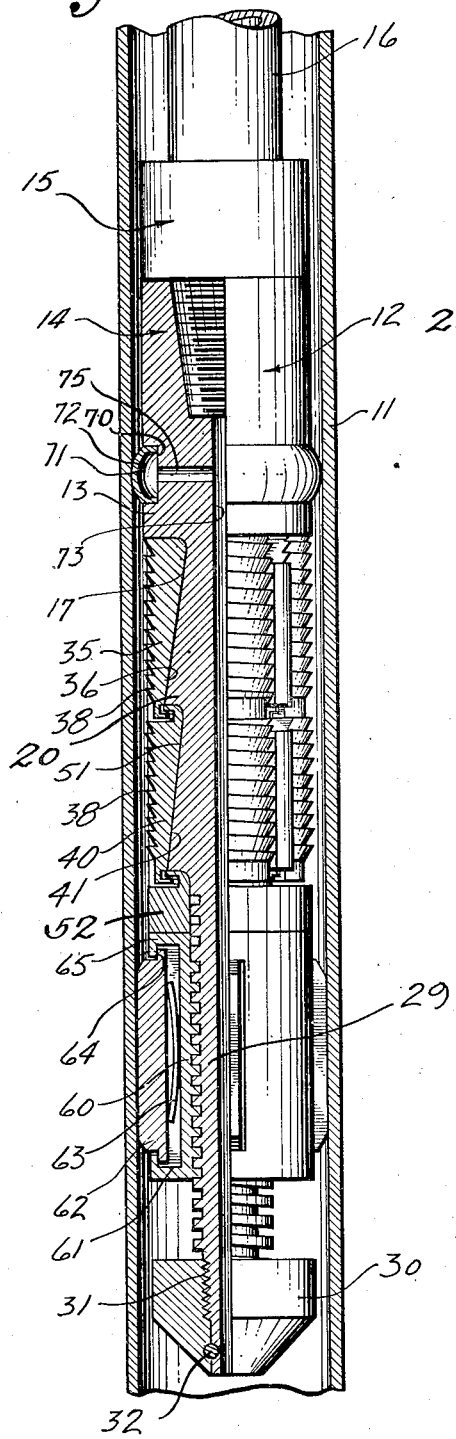
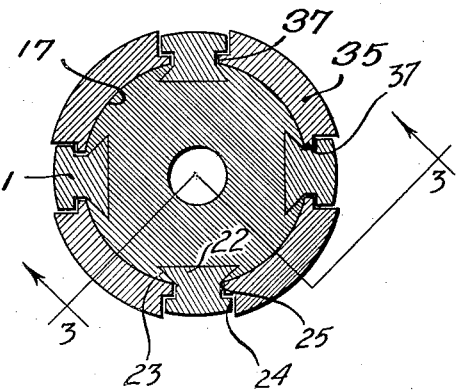
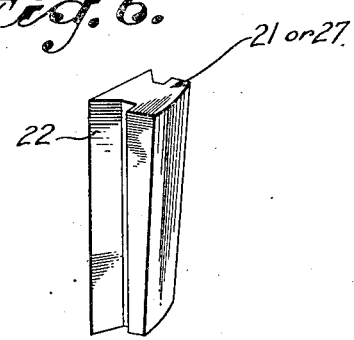
INVENTOR.
WINFIELD S. JONES
By
ATTORNEY Patented July 21, 1931

1,815,376

UNITED STATES PATENT OFFICE

WINFIELD S. JONES, OF BREA, CALIFORNIA

ROTARY SPEAR

Application filed October 6, 1928. Serial No. 310,741.

My invention relates to oil well equipment, and it relates particularly to a device for recovering lost parts from a well.

In the drilling of oil wells it often occurs that a pipe or casing which is extended into a well becomes disconnected or twisted off. Before the drilling or development of the well can be proceeded with, it is necessary to remove this casing or pipe. For this purpose it is ordinary practice to use a device commonly known as a rotary spear. A rotary spear consists of a body supporting jaws, and means whereby the jaws may be caused to grip the interior surface of the pipe so that it may be lifted to the surface of the ground.

It is a general object of this invention to provide a rotary spear whereby casing or pipe may be engaged and lifted to the surface of the ground.

In the ordinary form of rotary spear, if the casing or pipe which is to be engaged is irregular, all of the jaws will not properly engage; consequently there is a liability of the rotary spear losing its grip when it is attempted to lift the pipe or casing from the well. Oftentimes one or more of the jaws will not have any contact with the pipe or casing, and oftentimes only a small portion of all the jaws will have contact with the pipe or casing.

It is an object of this invention to provide a rotary spear in which the jaws are so constructed that even though the pipe or casing is irregular in shape, the jaws will engage the pipe or casing sufficiently to provide the necessary friction to raise the pipe or casing to the surface of the ground.

A further object of the invention is to provide a rotary spear in which the jaws are made comparatively short, and are arranged in longitudinal pairs so that they may separately conform to the contour of the pipe or casing.

Another object of the invention is to provide a rotary spear of this character in which the pairs of upper and lower jaws are loosely connected together so that their major movement is in unison, and so that they may have limited relative movement so that it is possible for them to conform to the contour of the casing.

A further object of the invention is to provide a rotary spear in which the lower ends of the lower jaws are protected.

A still further object of the invention is to provide a rotary spear of the character mentioned in which a sleeve is placed on the body of the rotary spear below the jaws, this sleeve having means for loosely connecting it to the jaws in order that the lower ends of the jaws may be protected, and in order that the lower ends of the jaws may have a limited movement relative to the sleeve.

Another object of the invention is to provide a rotary spear of the type described in which the jaws may be retracted when the device is in the well, so that it may be readily withdrawn therefrom in the event that it is impossible or undesirable to draw out the pipe or casing. This is a particularly important feature, as it is sometimes difficult or impossible to draw out the spear if the jaws engage the casing of the well, and in the present invention is simply accomplished by rotating the body of the spear.

Other objects and advantages will be pointed out in the following description of my invention.

Referring to the drawings in which my invention is illustrated,

Fig. 2 is a section taken on the line 2—2 of Fig. 1.

Fig. 3 is a section similar to Fig. 1, but showing the jaws forced into contracted position so that the rotary spear may be elevated to the surface of the ground.

Fig. 6 is a perspective view of a longitudinal bar utilized in the invention.

Figure 1:
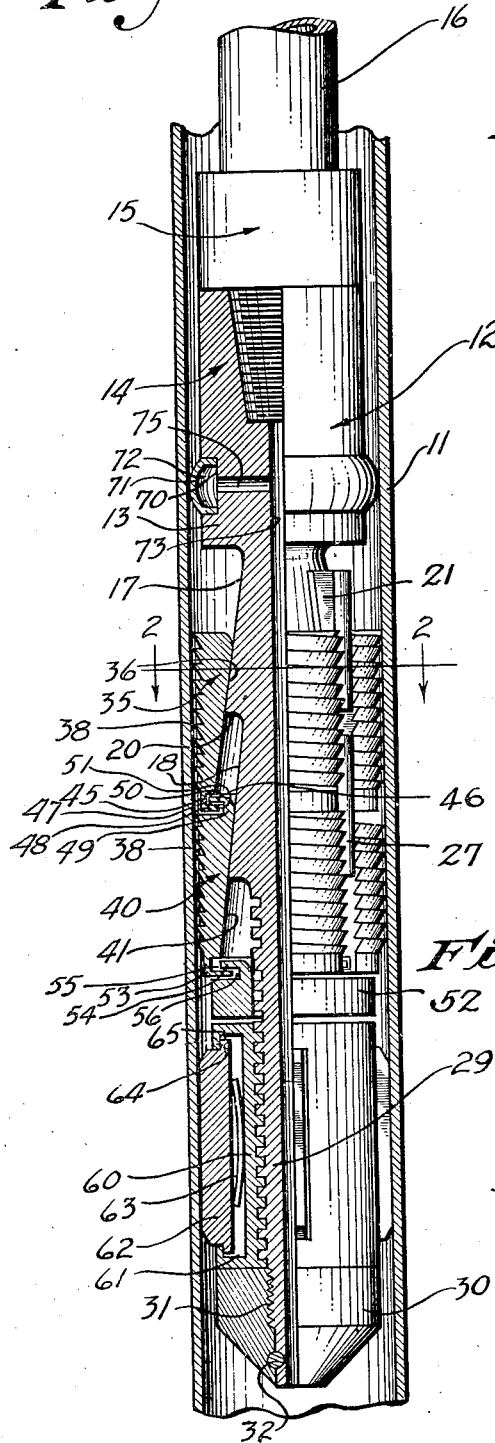
Fig. 1 is an elevational view in quarter-section showing a rotary spear in which the parts are in such a position that the jaws are in engagement with the casing or pipe to be removed from the well.
Figure 4:
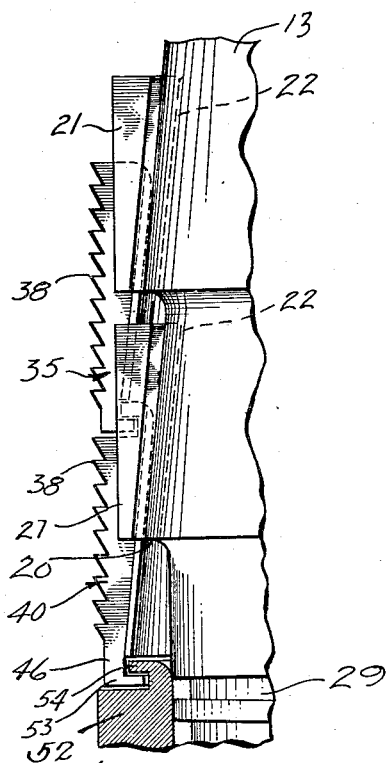
Fig. 4 is an enlarged fragmentary view showing the jaw construction of the invention.

Referring to the drawings, the numeral 11 represents a member which may be a pipe or casing, which must be removed from the well. The numeral 12 represents the rotary spear of my invention, which is adapted for removing the member 11 from the well.

The rotary spear 12 has a body 13. The upper end of the body 13 is provided in the form of a threaded box 14 to which the male section of a tool joint 15 is connected. This tool joint 15 is secured to the lower end of a pipe 16. The pipe 16, although not so illustrated in the drawings, extends to the surface of the well where it is associated with proper controlling mechanism. Formed on the body 13 below the box 14 is a plurality of upper ways 17 which are circumferentially arranged, and which are inclined downwardly and outwardly. Each of the upper ways 17 is of the same shape and taper. Below the upper ways 17 is a plurality of lower ways 18. The upper and lower ways are separated by a radial shoulder 20. The lower ways 18 are circumferentially arranged so that one lower way 18 is below each upper way 17. The lower ways 18 incline downwardly and outwardly and are the same taper as the upper ways 17.

Arranged between the upper ways 17 are upper longitudinal bars 21. These bars 21 have dovetail portions 22 which fit in dovetail grooves 23 formed longitudinally between the upper ways 17. The outer portions of the bars 21 are provided with flanges 24 in order that channels 25 may be provided at each side of the upper ways 17. Provided between the lower ways 18 are longitudinal lower bars 27, which are formed identical with the upper bars 21. These lower bars 27 are secured to the body 13 in the same manner as the upper bars 21, and form channels 25 at each side of the ways 18. The lower end of the body 13 is provided in the form of a threaded stem 29. To the lower end of the threaded stem 29 there is secured an abutment in the form of a nut 30. The nut 30 is screwed onto threads 31 of the threaded stem 29, and is locked thereto by means of a pin 32.

Adapted to travel along the upper ways 17 are upper jaws 35. These upper jaws 35 have inner faces 36 which are arcuated and tapered to correspond with the shape of the ways 17. The edges of the jaws 35 are provided with tongues 37 which are adapted to extend into the channels 25 in order that the upper jaws 35 may be caused to slide along the ways 17. The outer surface of the jaws 35 is serrated so as to provide teeth 38, these teeth 38 being adapted to slightly embed in the member 11 so that proper gripping engagement may be obtained.

Adapted to slide along the lower ways 18 are lower jaws 40. These lower jaws 40 have inner faces 41 which are tapered and arcuated complementary to the ways 18. These lower jaws 40 are provided with tongues 37 tapered to fit into the channels 25 of the lower bars 27 in order to retain these jaws in engagement with the ways 18. The outer surfaces of these lower jaws 40 are provided with teeth 38 so that the part 11 may be gripped.

It will be obvious from the drawings and the description that the upper and lower jaws 35 and 40 are vertically aligned so that they may be said to be grouped in pairs. The upper and lower jaws are somewhat shorter than the jaws ordinarily used in rotary spears, and each pair of upper and lower jaws may be said to correspond to a single jaw of the ordinary rotary spear. It is essential to the operation of the rotary spear of this invention that the jaws move downward along the ways 17 and 18, and upward along the ways 17 and 18, in substantial unison. However, it is absolutely essential to the accomplishment of the objects of this invention that there be a limited relative movement between each pair of jaws so that these jaws may relatively adjust themselves in order that the part 11 may be gripped, even though the contour thereof is irregular.

Figure 5:
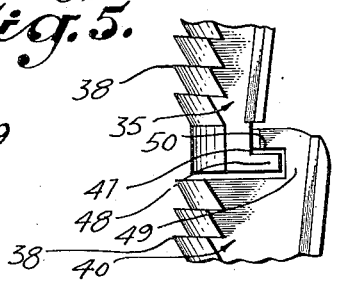
Fig. 5 is an enlarged fragmentary view showing the connecting means for loosely connecting the pairs of upper and lower jaws together.

For loosely connecting the pairs of upper and lower jaws together, my invention provides a connecting means which includes a lug 45 formed at the lower end of each upper jaw 35, and a lug 46 formed at the upper end of each lower jaw 40. As illustrated best in Fig. 5, the upper jaw lug 45 consists of a downwardly extending portion 47 and an inwardly extending portion 48. The lower jaw lug 46 consists of an upwardly extending portion 49 which extends upward outside the outer end of the portion 48, and an inwardly extending portion 50 which extends inwardly above the portion 48. The lug 46 therefore provides a journal 51 which opens inwardly, and into which the inwardly extending portion 48 extends. There is clearance between these parts so that there may be a limited up and down movement, and a limited relative in and out movement.

Arranged on the threaded stem 29 below the lower jaws 40 is an intermediate member in the form of a sleeve 52. This sleeve 52 is adapted to slide up and down on the lower part of the stem 29. In order that the sleeve may be loosely connected to the lower jaws 40 my invention provides lower connecting means which consists of a lug 53 connected to the lower end of each jaw 40, and a lug 54 connected to the upper part of the sleeve 52. The lug 54 may be entirely annular, or separate lugs 54 may be provided in each lug 53. The lugs 53 are of substantially the same shape as the lugs 45 formed at the lower ends of the upper jaws 35, and provide inwardly facing journals 55. The lugs 54 correspond in shape to the lugs 46 formed at the upper ends of the lower jaws 40, and provide outwardly facing journals 56. The lugs 53 and 54 are interlocked as shown, and spaces are provided around them so that there may be limited up and down movement, and a relative in and out movement of the lower jaws 40 and the sleeve 52.

Provided on the threaded stem 29 below the sleeve 52 is a threaded nut 60. The threaded nut 60 has cavities 61 which carry friction blocks 62. Friction blocks 62 are urged outward by springs 63, this outward movement being limited by the inner engagement of flanges 64 on the nut, and flanges 65 on the friction blocks. When the rotary spear is lowered into the part 11, the friction blocks are caused to frictionally engage the part 11 by the action of the springs 63.

The threaded box 14 is provided with an annular channel 70 therearound in which a sealing member 71 is positioned. The ends of this sealing member engage the walls of the channel 70 in sealing relationship and provide a chamber 72 communicating with a bore 73 of the box 14 by means of one or more passages 75. When a hydraulic pressure is built up in the pipe 16 this pressure is transmitted to the chamber 72 and forces the sealing member 71 outward into sealing engagement with the member 11. The sealing member 71 is preferably formed of rubber or other flexible material so that it may be slipped in place over the box 14.

The operation of my invention is substantially as follows:

The rotary spear is lowered into the well with the nut 60 in the position shown in Fig. 1. The engagement of the jaws 35 and 40 with any part of the outer casing in the well, or with the side of the well, tends to pull the jaws upward relative to the body 13 so that they are moved upward on the ways 17 and 18 into contracted position, such as is illustrated in Fig. 3. The sleeve 52 is moved upward with the jaws so that a space exists between the sleeve 52 and the nut 60. When the rotary spear enters the part 11, the downward motion is discontinued, and the upper and lower jaws slide downward along their respective ways 17 and 18, and move into engagement with the inner face of the pipe or casing 11. The pipe 16 which supports the rotary spear 12 is then lifted upward with the result that the body 13 of the rotary spear moves upward relative to the jaws 35 and 40. This causes the jaws to be moved downward relative to the body 13 onto the extreme lower ends of the ways 17 and 18. This, as will be obvious, forces the jaws outward so that the teeth 38 thereof securely grip the part 11. It will be obvious that when the weight of the part 11 is supported on the jaws 35 and 40, it tends to cause them to be even more securely gripped to the part 11. The pipe 16 is then lifted to the surface of the ground, and the rotary spear and part 11 are elevated therewith.

In view of the fact that the upper and lower pairs of jaws 35 and 40 are loosely connected together, they are free to individually adjust themselves to accommodate the contour of the part 11. Should the upper jaw or the lower jaw be required to move outward farther than the other jaw, it may do so in view of the fact that they are only loosely connected together. Should the contour of the casing be such that the upper and lower jaws could not possibly properly contact the casing, there is nothing to prevent the other jaw of that pair from properly engaging the part 11.

If difficulty is experienced in raising the member 11, it is advisable to force a fluid under pressure down the pipe 16. This fluid is usually in the form of mud and enters the chamber 72, thus forcing the sealing member 71 into sealing engagement with the member 11. This mud then builds up a pressure below the rotary spear which tends to force mud downward through the member 11 and upward therearound, thus acting to circulate around this member to free it.

Should the part 11 not be engaged at the first attempt, or should it be found impossible to lift it to the surface of the ground, and it is necessary to lift the rotary spear separately to the surface of the ground, the parts must be operated so that the jaws will move to retracted position in order that no other part of the apparatus in the well be engaged during the upward travel of the rotary spear. This is accomplished by shutting off the supply of mud so that the sealing member may contract, and subsequently rotating the pipe 16 so that the body 13 rotates therewith.

In view of the fact that the friction blocks 62 engage the part 11, the body will rotate relative thereto with the result that the nut 60 will be advanced upward along the threaded stem 29 by reason of the threaded engagement therewith. The nut 60 moves upward and engages the sleeve 52 so that the jaws 35 and 40 are moved from the position shown in Fig. 1 into the position shown in Fig. 3. In Fig. 3 the jaws are in retracted position, and the spear may be moved upward to the surface of the ground without danger of the jaws engaging any of the parts during its travel. It should be noticed that this relative rotation of the body 13 and the nut 60 forms a means of positively actuating all of the jaws in a manner to move these jaws into retracted position, a very important feature when it becomes necessary to withdraw the rotary spear.

As emphasized throughout the foregoing description, it is highly important to the invention, and it is a principal part of the invention to provide the jaws 35 and 40 in pairs loosely connected together, so that they may move relative to each other in order that the jaws may individually adapt themselves to the contour of the casing or pipe which is being removed from the well. Other details of construction are important to the invention. For example, the sleeve 52 and its loose connection to the lower jaws 40 are an important part of the invention, and the construction of the nut 60 and friction block 62 are likewise important to the invention.

I claim as my invention:

1. In a spear for recovering lost parts in a well, the combination of: a body having upper and lower tapered ways; upper jaws carried by said upper ways; lower jaws carried by said lower ways, said jaws being in contracted position in the upper ends of said ways and being expanded in the lower ends of said ways; connecting means in the form of interlocking lugs for connecting adjacent upper and lower jaws together, said connecting means permitting limited relative movement between said upper and lower jaws; and jaw operating means for moving said upper and lower jaws to contracted positions.

2. In a spear for recovering lost parts in a well, the combination of: a body having upper and lower ways circumferentially arranged, said ways being arranged so that one upper and lower way are longitudinally arranged in pairs; longitudinal bars arranged between adjacent upper ways, and between adjacent lower ways, said bars providing channels; upper jaws in said upper ways; lower jaws in said lower ways; tongues on said jaws adapted to extend into said channels for holding said jaws in said ways; connecting means for connecting adjacent upper and lower jaws together, said connecting means permitting limited relative movement between said upper and lower jaws; and jaw operating means for moving said upper and lower jaws to contracted positions.

3. In a spear for recovering lost parts in a well, the combination of: a body having upper and lower tapered ways; upper jaws carried by said upper ways; lower jaws carried by said lower ways, said jaws being in contracted position in the upper ends of said ways and being expanded in the lower ends of said ways; connecting means for connecting adjacent upper and lower jaws together, said connecting means permitting limited relative movement between said upper and lower jaws; a sleeve surrounding said body below said lower jaws; lower connecting means for connecting said lower jaws and said sleeve; and positive operating means below said sleeve operable to move said jaws along said ways from expanded to contracted position.

4. In a spear for recovering lost parts in a well, the combination of: a body having upper and lower tapered ways; upper jaws carried by said upper ways; lower jaws carried by said lower ways, said jaws being in contracted position in the upper ends of said ways and being expanded in the lower ends of said ways; connecting means in the form of interlocking lugs for connecting adjacent upper and lower jaws together, said connecting means permitting limited relative movement between said upper and lower jaws; a sleeve surrounding said body below said lower jaws; lower connecting means for connecting said lower jaws and said sleeve; and positive operating means below said sleeve operable to move said jaws along said ways from expanded to contracted position.

5. In a spear for recovering lost parts in a well, the combination of: a body having upper and lower ways circumferentially arranged, said ways being arranged so that one upper and lower way are longitudinally arranged in pairs; longitudinal bars arranged between adjacent upper ways, and between adjacent lower ways, said bars providing channels; upper jaws in said upper ways; lower jaws in said lower ways; tongues on said jaws adapted to extend into said channels for holding said jaws in said ways; connecting means for connecting adjacent upper and lower jaws together, said connecting means permitting limited relative movement between said upper and lower jaws; a sleeve surrounding said body below said lower jaws; lower connecting means for connecting said lower jaws and said sleeve; and positive operating means below said sleeve operable to move said jaws along said ways from expanded to contracted position.

6. In a spear for recovering lost parts from a well, the combination of: a body, said body having upper and lower ways; gripping means carried by said ways, said means being movable along said ways from retracted position to extended position and vice versa; and means associated with said body adapted to move said gripping means from extended to retracted position when said body is rotated.

7. In a spear for recovering lost parts from a well, the combination of: a body, said body having upper and lower ways, said body having a longitudinally recessed portion adjacent said lower way; gripping means carried by said ways, said gripping means being movable in said ways from retracted to extended position and vice versa, and said gripping means being adapted to engage a part to be recovered when in extended position; and means carried by said recessed portion adapted to move said gripping means from extended to retracted position when said body is rotated.

8. In a spear for recovering lost parts from a well, the combination of: a body, said body having a plurality of ways, and said body having a longitudinally recessed portion below said ways and adjacent thereto; gripping means carried by said ways, said gripping means being movable in said ways from retracted to extended position and vice versa, and said gripping means being adapted to engage a part to be recovered when in extended position; and means adopted to move said gripping means from extended to retracted position, said means comprising a collar threadedly carried by said recessed portion and having a shoulder adapted to engage said gripping means and a friction member associated with said collar and radially movable relative thereto adapted to engage said part to be recovered.

9. In a spear for recovering lost parts from a well, the combination of: a body, said body having a plurality of ways; gripping means carried by each of said ways, said gripping means being loosely joined together and movable as a whole from retracted to extended position and vice versa, and said gripping means being adapted to engage a part to be recovered when in extended position; and means associated with said body adapted to move said gripping means as a whole from extended to retracted position.

10. In a spear for recovering lost parts from a well, the combination of: a body, said body having a plurality of ways; gripping means carried by each of said ways, said gripping means being loosely joined together and movable as a whole from retracted to extended position and vice versa, and said gripping means being adapted to engage a part to be recovered when in extended position; and means associated with said body adapted to move said gripping means as a whole from extended to retracted position when said body is rotated.

11. In a spear for recovering lost parts from a well, the combination of: a body, said body having a plurality of ways, and said body having a longitudinally recessed portion below said ways and adjacent thereto; gripping means carried by said ways, said gripping means being movable in said ways from retracted to extended position and vice versa; means adapted to move said gripping means from extended to retracted position, said means comprising a collar threadedly carried by said recessed portion, said collar having an annular recessed portion adapted to receive a resilient friction member, said friction member and said collar being relatively movable; and means for rotating said body when in the well.

In testimony whereof, I have hereunto set my hand at Los Angeles, California, this 26th day of September, 1928.

WINFIELD S. JONES.